US008526639B2

(12) United States Patent
Terada et al.

(10) Patent No.: US 8,526,639 B2

(45) Date of Patent: Sep. 3, 2013

(54) DIGITAL MIXER

(75) Inventors: Kotaro Terada, Hamamatsu (JP); Hiroaki Fujita, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 423 days.

(21) Appl. No.: 12/835,495

(22) Filed: Jul. 13, 2010

(65) Prior Publication Data

US 2011/0009989 A1 Jan. 13, 2011

(30) Foreign Application Priority Data

Jul. 13, 2009 (JP) ................................ 2009-165153
Jul. 13, 2009 (JP) ................................ 2009-165154
Jul. 13, 2009 (JP) ................................ 2009-165155

(51) Int. Cl.
*H04B 1/00* (2006.01)

(52) U.S. Cl.
USPC .............................. 381/119; 700/94; 345/440

(58) Field of Classification Search
USPC ........................... 381/119; 700/94; 345/440
See application file for complete search history.

(56) References Cited

U.S. PATENT DOCUMENTS

2003/0059066 A1* 3/2003 Kohyama et al. ............. 381/119
2004/0184626 A1* 9/2004 Hagiwara ..................... 381/119

FOREIGN PATENT DOCUMENTS

GB 2 406 027 A 3/2005

OTHER PUBLICATIONS

Yamaha Corporation, PM5D/PM5D-RH V2 DSP5D, Digital Mixing Console, Digital Mixing System, Owner's Manual, 2004.
European Search Report mailed Feb. 6, 2013, for EP Application No. 10169333.1, eight pages.

* cited by examiner

*Primary Examiner* — Vivian Chin
*Assistant Examiner* — Paul Kim
(74) *Attorney, Agent, or Firm* — Morrison & Foerster LLP

(57) ABSTRACT

On a digital mixer, each channel is given a channel definition defining whether the channel is to be used individually or to be used as a group along with a certain channel. When a channel strip to which a user desires to assign and a channel which the user desires to assign are selected, it is determined whether the selected channel is a channel to be used individually or to be used as a group. When it is determined that the selected channel is to be used as a group, channels belonging to the group are assigned to the selected channel strip so that the user can concurrently control respective channels' values of a parameter by use of an operating element provided on the selected channel strip.

7 Claims, 12 Drawing Sheets

DIGITAL MIXER

BACKGROUND OF THE INVENTION

1. Field of the Invention

The present invention relates to a digital mixer having a capability of assigning user's desired channels to operating elements, respectively, provided on an external panel to allow the user to set or change a value/values of a parameter/parameters of a channel/channels assigned to one of the operating elements by a manipulation of the operating element.

2. Description of the Related Art

Conventionally, there have been digital mixers having physical operating elements such as faders and switches provided on an external panel (a mixing console). Some digital mixers are designed such that a console which is manipulated by a user is provided separately from a mixing engine which mixes input signals so that the console can be connected to the mixing engine with a cable. The other digital mixers are designed such that the console is integrated with the mixing engine. Whichever the digital mixer is, it is desired to save space necessary for the console in order to reduce the space required to install the digital mixer. In order to save the space, therefore, it is necessary to reduce the number of operating elements provided on the console. In recent years, however, because the number of channels processed on a digital mixer increases, it is of importance to handle a multiplicity of channels with a small number of operating elements. Particularly, efficiency, compactness and usability of the operating elements are desired for a digital mixer.

A prior art stated below discloses a digital mixer which has a plurality of channel strips each having operating elements such as a fader, a level meter and various buttons so that a user of the digital mixer can manipulate input channels that the user assigns to the channel strips, respectively. Schemes to assign the input channels to the channel strips include switching between layers (p. 45 of the prior art). By this scheme, the input channels of 48 channels, for example, are separated into the first layer of input channels 1 to 24 and the second layer of input channels 25 to 48 to allow the user to switch between the layers by use of a certain switch so that the input channels 1 to 24 or the input channels 25 to 48 are assigned to 24 channel strips, respectively. In this scheme, one channel is assigned to each channel strip regardless of whether the layer is on the first layer or on the second layer. Furthermore, the digital mixer of the prior art has a fader-assigning capability of assigning user's desired input channels to eight faders, respectively (p. 212 of the prior art). In this case as well, the number of input channel assigned to each fader is one. Furthermore, the digital mixer of the prior art also has a capability of assigning a plurality of channels to a certain channel strip referred to as a DCA strip to allow the user to control the assigned channels together by manipulating the channel strip (p. 81 of the prior art).

Prior Art: DIGITAL MIXING CONSOLE PM5D/PM5D-RH V2, DIGITAL MIXING SYSTEM DSP5D User's Manual, 2004, Yamaha Corporation

SUMMARY OF THE INVENTION

As for the above-described scheme by which one channel is assigned to each channel strip, the number of channels assigned to the channel strips is limited to the number of channel strips. In a case where two channels correlated with each other as stereo channels or six channels correlated with each other as surround channels are to be assigned, therefore, such channels occupy two or six channel strips. In many cases, however, the user tends to perform the same manipulation for each of the correlated channels. It is quite inefficient, therefore, to occupy as many channel strips as the correlated channels.

The DCA strip, to which a plurality of channels can be assigned, can avoid such inefficient use of channel strips. However, the manipulation of assigning channels to the DCA strip is burdensome and troublesome, since a user needs select all channels the user desires to assign. In addition, parameters that can be controlled on the DCA strip are only those parameters which concurrently affect all the channels assigned to the DCA strip. In order to individually control a parameter value of one of the channels assigned to the DCA strip, the user has to assign the channel to another channel strip so that the user can individually control the parameter of the channel on the channel strip. As a result, the digital mixer of the prior art ended up such inefficient use of channel strips.

The present invention was accomplished to solve the above-described problems, and an object thereof is to provide a digital mixer which enables efficient assignments of channels to a small number of channel strips by easy manipulation, and allows efficient use of the small number of channel strips so that, even in a case where a plurality of channels are assigned to a channel strip, a user can control respective basic parameter values of the assigned channels by use of operating elements provided on the channel strip.

In order to achieve the above-described object, it is a feature of the present invention to provide a digital mixer including a plurality of processing channels each processing an audio signal in accordance with a parameter; a plurality of channel strips each having an operating element for setting or changing the parameter of the processing channel included in the plurality of processing channels and assigned to the channel strip; a channel definition setting portion for setting a channel definition defining whether a processing channel included in the plurality of processing channels is to be used individually or to be used as a group along with another processing channel; a channel strip selecting portion for selecting a channel strip from among the plurality of channel strips; a processing channel selecting portion for selecting a processing channel from among the plurality of processing channels; a determination portion for determining, in accordance with the channel definition provided for the selected processing channel, whether the selected processing channel is a processing channel which is to be used individually or a processing channel which is to be used as a group; an individual channel assigning portion for assigning, when it is determined by the determination portion that the selected processing channel is a processing channel which is to be used individually, the selected processing channel to the selected channel strip, and allowing control of the parameter of the selected processing channel with the operating element of the channel strip to which the selected processing channel is assigned; and a grouped channel assigning portion for assigning, when it is determined by the determination portion that the selected processing channel is a processing channel which is to be used as the group, the processing channels belonging to the group to the selected channel strip or channel strips including the selected channel strip, and allowing control of the respective parameters of the assigned processing channels belonging to the group with the operating element of the channel strip to which the processing channels are assigned or with the respective operating elements of the channel strips to which the processing channels are assigned.

It is another feature of the present invention to provide a digital mixer including a plurality of processing channels each processing an audio signal in accordance with a plurality of parameters; a plurality of channel strips each having a plurality of operating elements for setting or changing the parameters of the processing channel included in the plurality of processing channels and assigned to the channel strip; the operating elements including a shared operating element used in order to set or change the parameter which is able to affect two or more of the processing channels, and an individual operating element used in order to set or change the parameter which is controlled individually for each of the processing channels; an assigning portion for assigning one or more of the plurality of processing channels to each of the channel strips; an individually controlled channel setting portion for selecting, in a case where two or more of the processing channels are assigned to the channel strip, one of the two or more processing channels as a processing channel which is to be affected by a manipulation of the individual operating element of the channel strip; a first parameter controlling portion for controlling, in a case where the operating element of the channel strip to which one of the processing channels is assigned by the assigning portion is manipulated, the parameter of only the assigned processing channel in accordance with the manipulation of the operating element regardless of whether the manipulated operating element is the shared operating element or the individual operating element; and a second parameter controlling portion for controlling, in a case where the shared operating element of the channel strip to which two or more of the processing channels are assigned by the assigning portion is manipulated, the respective parameters of the assigned processing channels together in accordance with the manipulation of the shared operating element, and controlling, in a case where the individual operating element of the channel strip is manipulated, the parameter of only the processing channel selected from among the assigned processing channels by the individually controlled channel setting portion in accordance with the manipulation of the individual operating element.

The present invention enables automatic assignment of a plurality of channels to a channel strip in accordance with a channel definition and an assignment rule, without forcing a user to perform the burdensome manipulations of assigning every channel that the user desires to assign to the conventional DCA strip. By the simple manipulation of selecting a channel strip and a channel, more specifically, the digital mixer of the present invention enables the user to assign a plurality of channels to the channel strip. Furthermore, the digital mixer of the present invention enables efficient assignments of channels to a small number of channel strips. Even in a case where a plurality of channels are assigned to a channel strip, in addition, the user can control respective basic parameter values of the assigned channels by use of an operating element provided on the channel strip. Therefore, the digital mixer of the present invention avoids inefficient use of channel strips.

DESCRIPTION OF THE PREFERRED EMBODIMENT

An embodiment of the present invention will now be described with reference to the drawings.

Figure 1:
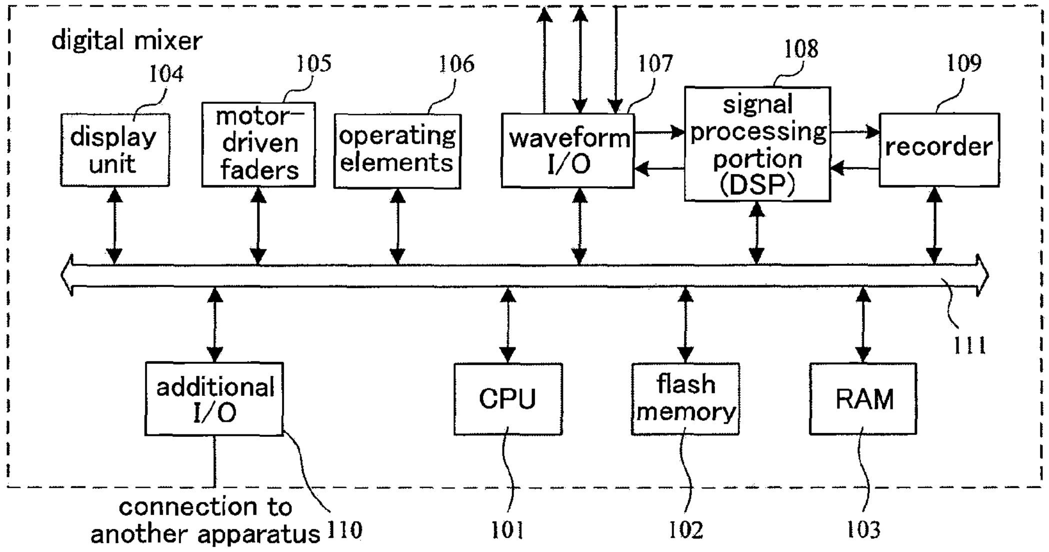
FIG. 1 is a block diagram of a hardware configuration of a digital mixer according to an embodiment of the present invention.

FIG. 1 is a block diagram indicative of a hardware configuration of a digital mixer which is the embodiment of the present invention. A central processing unit (CPU) 101 is a processing unit which controls the entire mixer. A flash memory 102 is a nonvolatile memory which stores various kinds of programs executed by the CPU 101 and various kinds of data. A random-access memory (RAM) 103 is a volatile memory used as an area where programs executed by the CPU 101 are loaded and as a working area for the programs. A display unit 104 is a display provided on an operating panel of the mixer in order to display various kinds of information. Motor-driven faders 105 are operating elements provided on the operating panel in order to control levels. Operating elements 106 are various operating elements (other than the motor-driven faders) provided on the operating panel in order to be manipulated by a user. A waveform input/output interface (I/O) 107 is an interface for transmitting/receiving waveform signals to/from an external apparatus. A signal processing portion (DSP) 108 mixes waveform signals input through the waveform I/O 107, adds effects to the signals and controls respective levels of tone volume of the signals by executing various kinds of microprograms on the basis of instructions made by the CPU 101. The signal processing portion 108 then outputs the processed waveform signals through the waveform I/O 107. A recorder 109 records musical tone signals input from the DSP 108 and reproduces recorded musical tone signals. An additional I/O 110 is an interface for connecting another apparatus with the digital mixer. A bus 111, which is a bus line for connecting the above-described constituents with each other, is a generic name for control bus, data bus and address bus.

Figure 2:
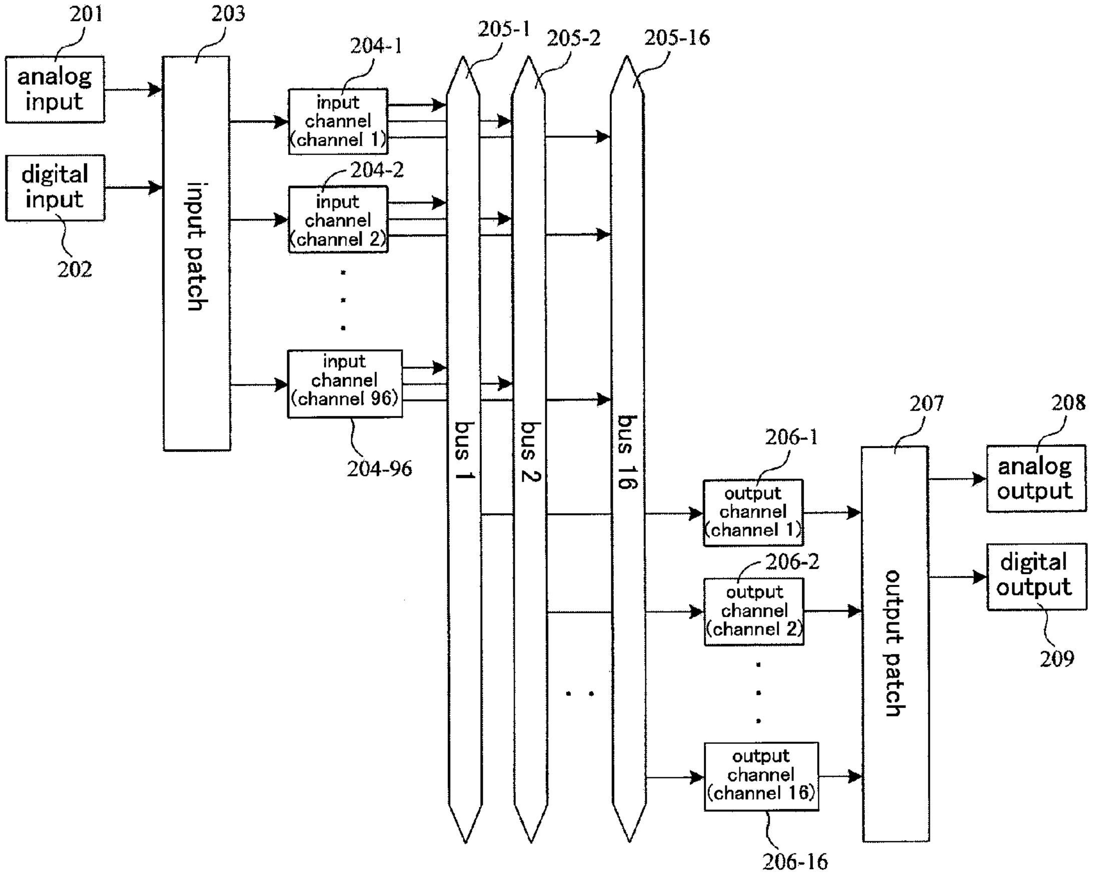
FIG. 2 is a block diagram of a functional configuration of the digital mixer.

FIG. 2 is a block diagram indicative of a functional configuration of the digital mixer indicated in FIG. 1. An analog input 201 indicates an input obtained by converting an analog acoustical signal input by use of a microphone or the like into a digital signal. A digital input 202 indicates an input of a digital acoustical signal. There can be plural analog inputs 201 and plural digital inputs 202, although there are respective upper limits of the respective numbers of the inputs according to the configuration of the digital mixer. An input patch 203 connects the above-described input lines arbitrarily for input channels 204. The connections can be made by a user as desired on a certain screen. The input channels 204 have 96 separate single channels. Signals can be selectively output from the input channels 204 to sixteen MIX buses 205. Furthermore, respective send levels can be set separately. The respective input channels 204 process audio signals in accordance with set parameters.

Each of the sixteen MIX buses 205 mixes signals input from the input channels 204. The mixed signals are output to output channels 206 (channel 1 to channel 16) corresponding to the mix buses, respectively. The MIX buses 205 are in a one-to-one correspondence with the output channels 206. The respective output channels 206 process audio signals in accordance with set parameters. The output from the output channels 206 is input to an output patch 207. The output patch 207 connects the output channels 206 arbitrarily for an analog output 208 or a digital output 209. The connections can be made by the user as desired on a certain screen.

The input portions 201, 202 and the output portions 208, 209 are realized by the waveform I/O 107 of FIG. 1. The other portions 203 to 207 are realized by certain microprograms executed by the DSP 108. The microprograms are transmitted from the CPU 101 to the DSP 108 so that the DSP 108 can execute the microprograms. In addition, coefficient data used for the execution of the microprograms by the DSP 108 are also transmitted from the CPU 101 to the DSP 108.

Figure 3:
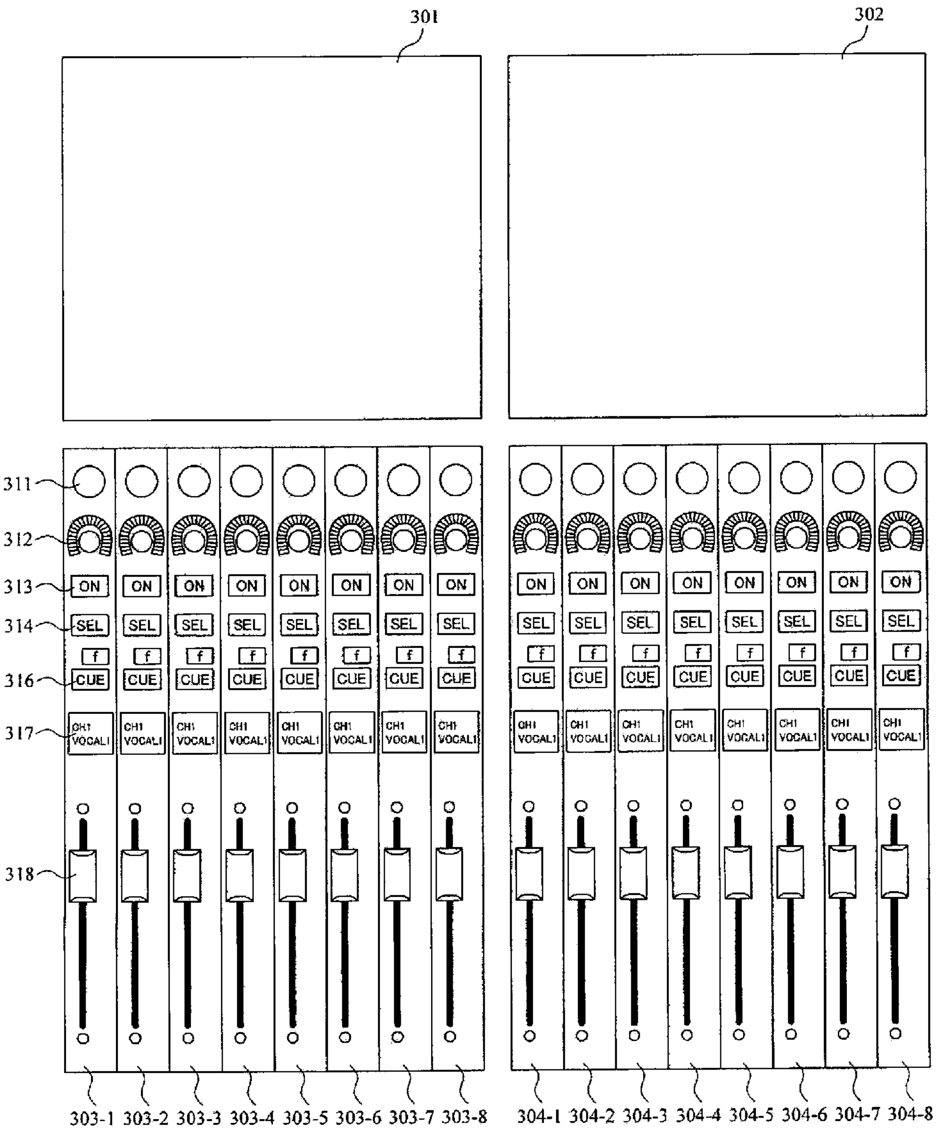
FIG. 3 is an external view (partial) of an external panel of the digital mixer.

FIG. 3 is an external view (partial) of an external panel of the digital mixer of the embodiment. Displays 301, 302 (the display unit 104 of FIG. 1) display various kinds of information. Below the respective displays 301, 302, channel strip portions (the motor-driven faders 105 and the operating elements 106 of FIG. 1) are provided. The left channel strip portion has eight channel strips 303-1 to 303-8, and the right channel portion has eight channel strips 304-1 to 304-8. Each channel strip such as the channel strip 303-1 has rotary encoders 311, 312, an ON switch 313, a SEL switch 314, a CUE switch 316, a display 317 and a motor-driven fader 318. The rotary encoder 311 serves as an operating element whose function varies according to what is displayed on the upper display 301. The rotary encoder 312, which is a rotary encoder for controlling various parameters, has an LED used as a level meter provided around the encoder. The ON switch 313 switches a channel assigned to the channel strip 303-1 between on and off. The SEL switch 314 is used in order to select a channel assigned to the channel strip 303-1. The motor-driven fader 318 controls the level of the assigned channel. The knob of the motor-driven fader 318 can be placed at any position in accordance with instructions made by the CPU 101.

The RAM 103 of FIG. 1 has a current memory. The current memory stores respective current values of various parameters (including parameters for signal processing channels, of course) used on the digital mixer. As for the parameters which are included in the parameters stored in the current memory and related to signal processing performed by the DSP 108, current values of such parameters are also provided for the DSP 108 as coefficient data so that the DSP 108 can control various kinds of signal processing (mixing) in accordance with the current values. The current values of the parameters stored in the current memory can be changed by use of the motor-driven faders or the other operating elements. By a manipulation of an operating element of a channel strip indicated in FIG. 3, more specifically, a current value of a parameter which is stored in the current memory and corresponds to the manipulated operating element changes according to the manipulation, so that the changed new current value is provided for the DSP 108 to affect the signal processing performed by the DSP 108. In addition, the current memory has an assignment information storage area and a front channel storage area for each of the channel strips. The assignment information storage area provided for a channel strip stores assignment information indicative of a channel actually assigned to the corresponding channel strip at the present moment. The front channel storage area provided for a channel strip stores front channel information indicative of a channel actually assigned to the corresponding channel strip as a front channel at the present moment. The front channel will be described in detail later.

Figure 4:
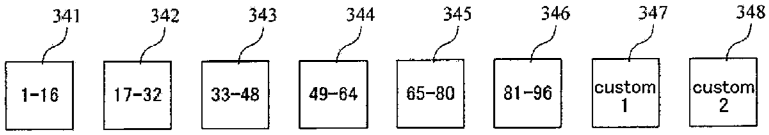
FIG. 4 is an external view of channel keys and custom keys provided on the external panel of the digital mixer

FIG. 4 indicates channel keys and custom keys provided on the external panel of the digital mixer of the embodiment. A channel key 341 is a key for assigning channels 1 to 16. When the key 341 is turned on, the input channels of channel 1 to channel 16 from the left are assigned to the sixteen channel strips 303-1 to 303-8, 304-1 to 304-8 of FIG. 3, respectively. More specifically, the assignment information storage areas of the current memory are provided with assignment information indicative of the orderly assignments of channels 1 to 16 to the channel strips 303-1 to 303-8, 304-1 to 304-8. By such assignments, a manipulation of the fader 318 of the channel strip 303-1, for example, results in the control of the level of channel 1. The channel keys 342 to 346 operate similarly. That is, the channel keys 342 to 346 are keys for assigning input channels 17 to 32, input channels 33 to 48, input channels 49 to 64, input channels 65 to 80, and input channels 81 to 96 to the channel strips, respectively. By the channel assignments by use of any one the channel key 341 to 346, channels are assigned to the channel strips in a one-to-one correspondence.

The custom keys 347, 348 (hereafter, referred to as custom keys 1, 2) are keys for reading out custom files 1, 2, respectively, to assign channels to the channel strips in accordance with the read custom file. Each custom file stores assignment information indicative of assignments of the channels to the respective channel strips. The custom files 1, 2 are stored in the flash memory 102. When either of the custom keys 1, 2 is turned on, the corresponding custom file 1 or 2 is read out. The assignment information stored in the read custom file is provided for the assignment information storage areas of the current memory. Although details will be described later, by the assignments by use of the custom file, a plurality of channels can be assigned to each channel strip. In such a case, a manipulation of the fader of a channel strip results in the concurrent control of respective levels of the channels assigned to the channel strip all at once.

Figure 5:
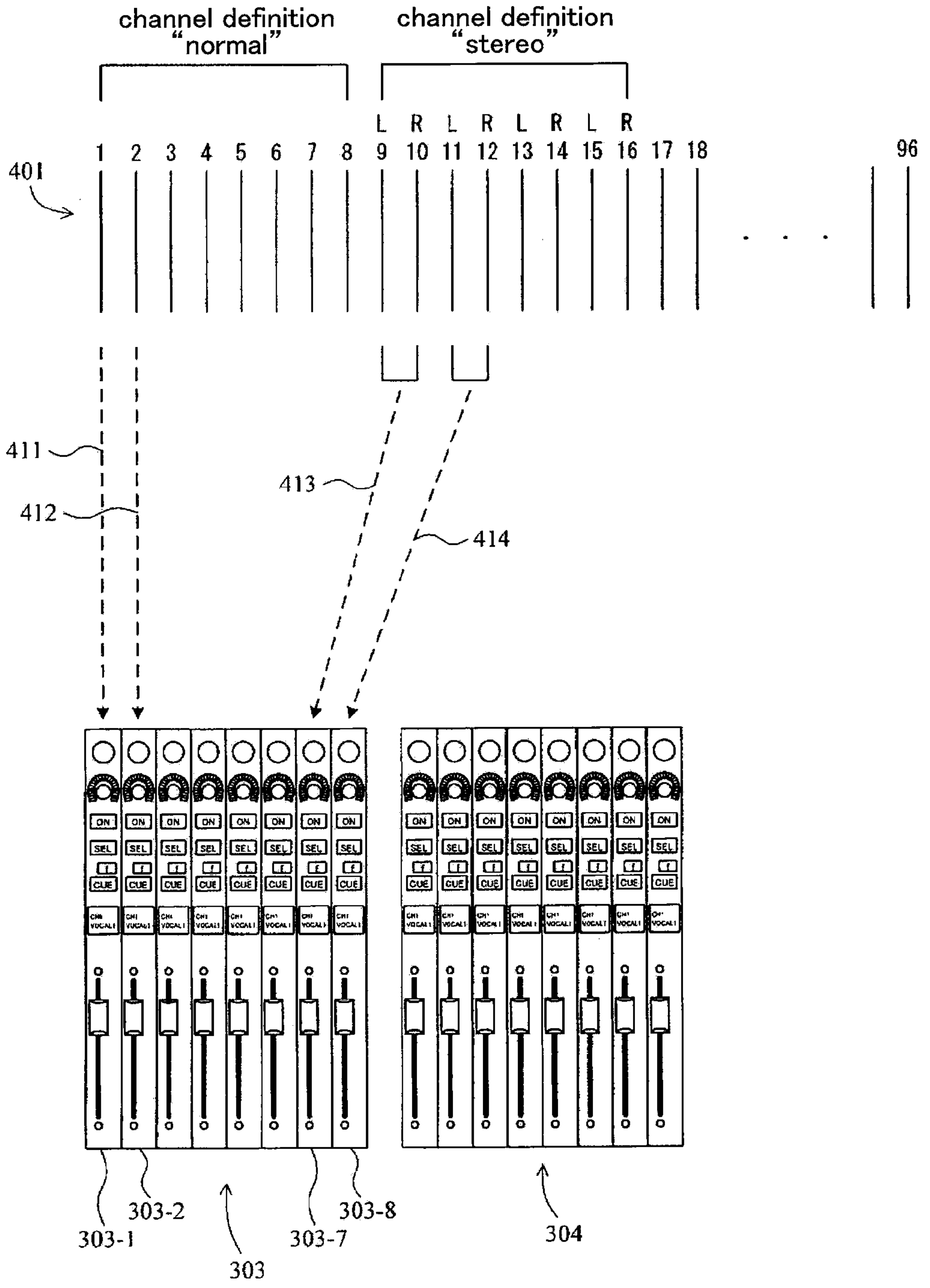
FIG. 5 is the first example editing of a custom file according to the embodiment.
Figure 6:
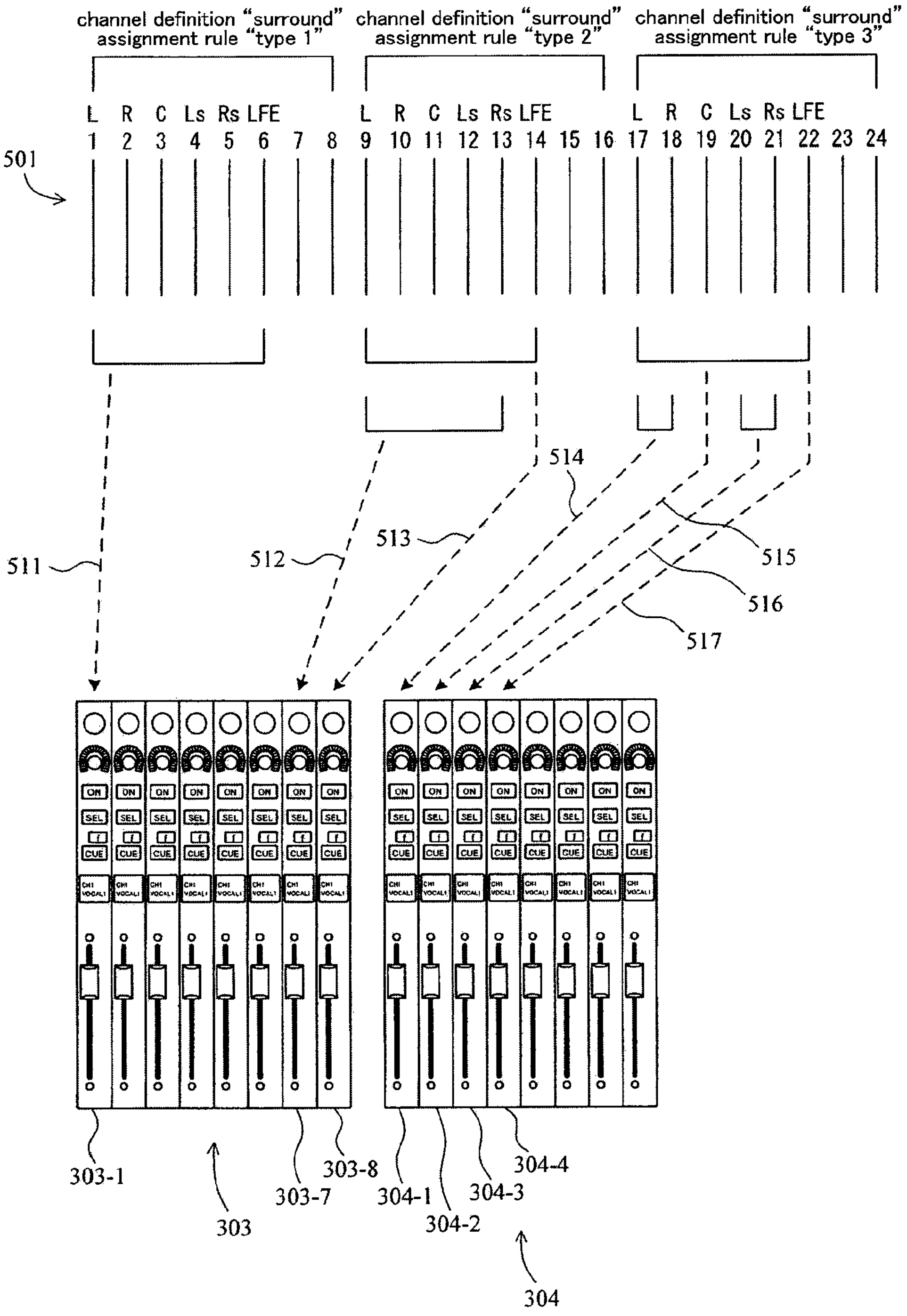
FIG. 6 is the second example editing of the custom file according to the embodiment.

Referring to FIG. 5 and FIG. 6, example editing of a custom file will be described. First, channel definitions which are a premise for editing the custom file will be described.

The input channels 1 to 96 are previously divided into blocks each having eight channels (separated into blocks each having eight channels, starting channel 1). By providing each channel block with a channel definition, the user is able to give a channel definition to the respective channels of each block. The programmable channel definitions include "normal", "stereo" and "surround". The user provides a channel definition for each block having eight channels, such as "normal" for the block of channels 1 to 8, "stereo" for the block of channels 9 to 16, etc. The channel definition can be provided for the respective channels by any manner. Although this embodiment employs the manner in which the channel definition is provided for each block having eight channels, a different manner in which the channel definition is individually provided for each channel may be employed. The channel definitions provided for the respective channels by the user are stored in the flash memory 102. In a case where "surround" is provided as channel definition, an assignment rule which will be described later is also provided. The assignment rule is also stored in the flash memory 102 along with the channel definition.

"Normal" indicates that each channel included in the block is to be dealt as a separate normal channel. "Stereo" indicates that the channels included in the block are separated into pairs of two channels in ascending order of channel number so that the two channels of each pair can be used as the channels of L and R of stereo. "Surround" indicates that the first six channels of the eight channels of the block are designated as 5.1 ch surround.

In FIG. 5, for example, the block of channels 1 to 8 is "normal", while the block of channels 9 to 16 is "stereo". Vertical lines indicated by a numeral 401 indicate respective lines of the respective 96 input channels. Respective numbers placed above the respective vertical lines coincide with the respective channel numbers. In the example of FIG. 5, the block of channels 9 to 16 is defined as "stereo", so that the channels are defined such that channel 9 is paired with channel 10 to be a pair of stereo L and R, channel 11 is paired with channel 12 to be a pair of stereo L and R, etc. In an example of FIG. 6, furthermore, the block of channels 1 to 8, the block of channels 9 to 16, and the block of channels 17 to 24 are defined as "surround", respectively. Vertical lines indicated by a numeral 501 indicate respective lines of the respective 96 input channels. Respective numbers placed above the vertical lines coincide with the respective channel numbers. In the example of FIG. 6, the block of channels 1 to 8 is defined as "surround", so that the channels are defined such that the first six channels of the eight channels are defined as L, R, C, Ls, Rs and LFE of surround in the order in which the channels appear. The blocks of channels 9 to 16, and channels 17 to 24 are similarly configured. "L", "R", "C", "Ls", "Rs", and "LFE" indicate signals of front left (L), front right (R), center (C), left surround (Ls), right surround (Rs) and woofer (LFE) outputting deep bass sound, respectively.

Each pair having two channels of stereo L, R defined as "stereo" and each set having six channels of L, R, C, Ls, Rs, and LFE of 5.1 surround defined as "surround" is referred to as a "group". Furthermore, the channels belonging to a "group" are referred to as "grouped" channels. In FIG. 5, for instance, channels 9 and 10 form a "group", while channels 11 and 12 form another "group". In FIG. 6, the six channels of channels 1 to 6, channels 9 to 14, or channels 17 to 22 form a "group", respectively. Those channels which are defined as "normal" will not form any group.

In a case where "surround" is provided as a channel definition as indicated in FIG. 6, the user is to select one of the assignment rules, "type 1", "type 2" and "type 3" for the respective blocks. The assignment rules will be described in detail later.

As described above, the user provides a channel definition for every input channel before editing the custom file. For editing the custom file, the user performs a certain manipulation to enter an edit mode to select one of the 16 channel strips 303-1 to 303-8, 304-1 to 304-8 to select a channel which is to be assigned to the selected channel strip. The custom file which is to be edited is either the custom file 1 which is to be used when the custom key 1 is turned on or the custom file 2 which is to be used when the custom key 2 is turned on. The custom files 1, 2 are stored in the flash memory 102.

In FIG. 5, a dotted arrow 411 indicates a case where the channel strip 303-1 is selected in the edit mode with the channel 1 being selected as a channel which is to be assigned to the channel strip. In this case, because the channel definition of the channel 1 is "normal", the channel is singly assigned to the channel strip. Consequently, the channel 1 is assigned to the channel strip 303-1. Similarly, a dotted arrow 412 indicates that the channel 2 is assigned to the channel strip 303-2. A dotted arrow 413 indicates a case where the channel strip 303-7 is selected with either the channel 9 or 10 being selected as a channel which is to be assigned. Assuming that the channel 9 is selected, because the channel definition of the selected channel 9 is "stereo", which means that the channel 9 is included in a group, the channels belonging to the group, that is, both the selected channel and a channel paired with the selected channel are assigned to the channel strip together. Consequently, the channels 9 and 10 are assigned to the channel strip 303-7. A case where not the channel 9 but the channel 10 is selected is also similar. Similarly, furthermore, when either the channel 11 or 12 is selected as indicated by a dotted arrow 414, both the channels 11 and 12 are assigned to the channel strip 303-8 together.

Assume that the custom file 1 is selected as a file to edit, with channels being assigned as explained with reference to FIG. 5 to finish the edit mode. By these procedures, the custom file 1 is to store the assignment information explained with reference to FIG. 5. When the user then turns on the custom key 1, the assignments of the channels to the channel strips are realized in accordance with the custom file 1. More specifically, the assignment information is read out from the custom file 1 into the assignment information storage areas of the current memory, so that the channel 1 is assigned to the channel strip 303-1, the channel 2 is assigned to the channel strip 303-2, the channels 9 and 10 are assigned to the channel strip 303-7, and the channels 11 and 12 are assigned to the channel strip 303-8, respectively. As a result, by manipulating the fader of the channel strip 303-1, the user is able to change the level of the channel 1. By manipulating the fader of the channel strip 303-7, the user is able to change the respective levels of the channels 9 and 10 together.

In FIG. 6, a dotted arrow 511 indicates a case where the channel strip 303-1 is selected in the edit mode with one of the channels 1 to 6 being selected as a channel which is to be assigned to the channel strip. Assume that the channel 1 is selected. In this case, the channel definition of the selected channel 1 is "surround", with the assignment rule of "type 1" being programmed. "Type 1" is a rule by which the grouped six channels which form 5.1 ch surround are to be assigned to one channel strip all at once. Therefore, the six channels of 5.1 ch surround belonging to the same group as the channel 1 are assigned to the channel strip all at once. By the user's selections, therefore, the channels 1 to 6 are assigned to the channel strip 303-1. Even a case where the user selects not the channel 1 but one of the channels 2 to 6 results in the same assignment.

Dotted arrows 512, 513 indicate a case where the channel strip 303-7 is selected with one of the channels 9 to 14 being selected as a channel which is to be assigned to the channel strip. Assume that the channel 9 is selected. In this case, the channel definition of the selected channel 9 is "surround", while the assignment rule of "type 2" is programmed. "Type 2" is a rule by which the first five channels (i.e., L, R, C, Ls, Rs) of the six channels grouped as 5.1 ch surround are to be assigned to one channel strip together, with the remaining one channel (i.e., LFE) being to be assigned to another channel strip. That is, among the six channels which include the selected channel 9 and form 5.1 ch surround, the first five channels 9 to 13 are assigned to the channel strip 303-7 together (arrow 512), while the remaining channel 14 is assigned to the channel strip 303-8 (arrow 513). Cases where not the channel 9 but one of the channels 10 to 14 is selected are similar. Because the type 2 requires two channel strips, when the selected channel strip is one of the channel strips 303-1 to 303-7, the selected channel strip and a channel strip situated on the right of the selected channel strip are used, so that the first five channels of the six channels of 5.1 ch surround are assigned to the selected channel strip, with the remaining channel being assigned to the channel strip situated on the right of the selected channel strip. In a case where the selected channel strip is the channel strip 303-8, the first five channels of the six channels of 5.1 ch surround are assigned to the channel strip situated on the left of the channel strip 303-8, while the remaining channel is assigned to the selected channel strip 303-8. Cases where the channels are assigned to the channel strips of the channel strip 304 side are similar.

Dotted arrows 514 to 517 indicate a case where the channel strip 304-1 is selected with one of the channels 17 to 22 being selected as a channel which is to be assigned to the channel strip. Assume that the channel 17 is selected. In this case, the channel definition of the selected channel 17 is "surround", while the assignment rule of "type 3" is programmed. "Type 3" is a rule by which the first two channels (i.e., L, R) of the six channels grouped as 5.1 ch surround are to be assigned to one channel strip together, the next one channel (i.e., C) being to be assigned to another channel strip, the next two channel (i.e., Ls, Rs) being to be assigned to a different channel strip together, and the remaining one channel (i.e., LFE) being to be assigned to a further different channel strip. That is, among the six channels which include the selected channel 17 and form 5.1 ch surround, the first two channels (L, R) are assigned to the channel strip 304-1 together (arrow 514), with the next one channel (C) being assigned to the channel strip 304-2 (arrow 515), the next two channels (Ls, Rs) being assigned to the channel strip 304-3 together (arrow 516), and the last channel (LFE) being assigned to the channel strip 304-4 (arrow 517). Cases where not the channel 17 but one of the channels 18 to 22 is selected are similar. Because the type 3 requires four channel strips, when the selected channel strip is one of the channel strips 304-1 to 304-5, the four channel strips formed of the selected channel strip and three channel strips situated on the right of the selected channel strip are used to assign the respective channels in the above-described order. In a case where the selected channel strip is one of the channel strips 304-6 to 304-8, the four channel strips formed of the selected channel strip and the three channel strips situated on the left are used to assign the respective channels in the above-described order. Cases where the channels are assigned to the channel strips of the channel strip 303 side are similar.

Assume that the custom file 1 is selected as a file to edit, with channels being assigned as explained with reference to FIG. 6 to finish the edit mode. By these procedures, the custom file 1 is to store the assignment information explained with reference to FIG. 6. When the user then turns on the custom key 1, the assignments of the channels to the channel strips are realized in accordance with the custom file 1. More specifically, the assignment information is read out from the custom file 1 into the assignment information storage areas of the current memory, so that the channels 1 to 6 are assigned to the channel strip 303-1, the channels 9 to 13 are assigned to the channel strip 303-7, the channel 14 is assigned to the channel strip 303-8, the channels 17 and 18 are assigned to the channel strip 304-1, the channel 19 is assigned to the channel strip 304-2, the channels 20 and 21 are assigned to the channel strip 304-3, and the channel 22 is assigned to the channel strip 304-4, respectively. As for the channel strips to which two or more channels are assigned, by manipulating the fader of such a channel strip, the user is able to change the respective levels of the assigned channels together.

"Together" indicates that respective values of a parameter of a plurality of channels are changed concurrently in response to a single manipulation. That is, the single manipulation results in concurrent changes in the respective values of a parameter of one kind of the channels. More specifically, the amount of manipulation derived from the single manipulation is shared by the plurality of channels (i.e., each of the channel uses the amount of manipulation to change its parameter value). The manners of changing parameter values include a manner in which the respective parameter values of the channels change according to the amount of manipulation on the basis of absolute value, and a manner in which the parameter values change on the basis of relative value. The manner in which the respective parameter values change on the basis of absolute value (in which the respective parameter values change together on the basis of absolute value) is a manner in which a value determined according to the amount of manipulation is regarded as a new current value to replace the respective parameter values of the channels with the new current value, so that the new current value is respective new current values of the parameter of the channels. The manner in which the parameter values change on the basis of relative value (in which the parameter values change together on the basis of relative value) is a manner in which a new current value of the parameter of a channel is obtained on the basis of both a value determined according to the amount of manipulation and a current value of the parameter of the channel (e.g., addition/subtraction of the two values). By the relative manner, more specifically, a new current value of each of the channels is obtained on the basis of its current value and the value determined according to the amount of manipulation. That is, the relative manner is such a manner as increase/decrease respective levels of the channels according to a single manipulation of the fader of a channel strip while maintaining current relative level balance.

Figure 7:
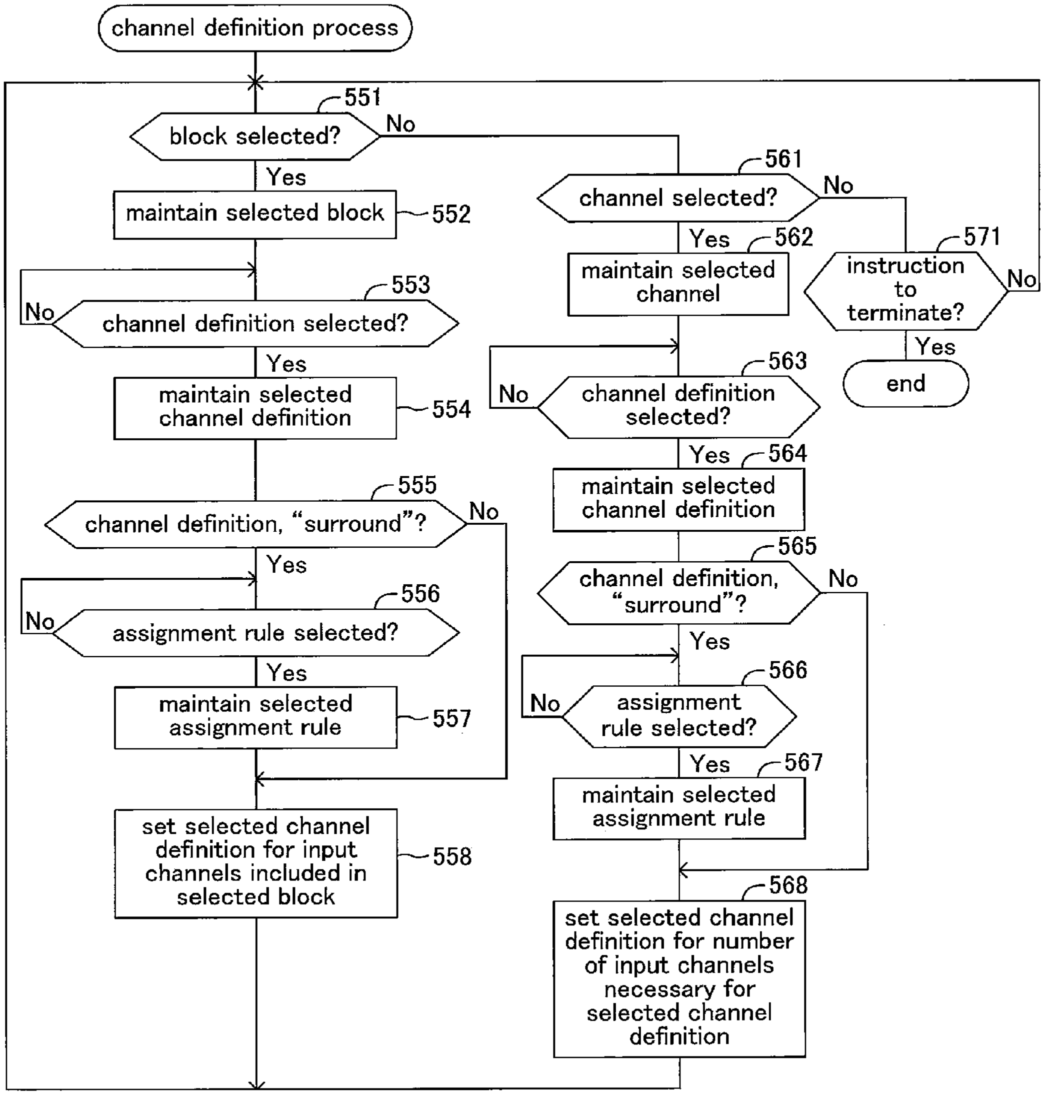
FIG. 7 is a flowchart of a channel definition process according to the embodiment.

FIG. 7 is a flowchart of a channel definition process. When the user performs certain manipulations to enter a channel definition mode, the process indicated in FIG. 7 starts. In steps 551 to 558, channel definitions are made for the respective blocks formed of the input channels 1 to 8, channels 9 to 18, etc. in accordance with user's selections. When one of the blocks is selected, "yes" is given in step 551 to maintain the selected block in step 552. When any of the channel definitions is selected from among "normal", "stereo" and "surround", "yes" is given in step 553 to maintain the selected channel definition in step 554. When the selected channel definition is "surround", "yes" is given in step 555 to wait for user's selection of an assignment rule. When any of the assignment rules is selected from among "type 1", "type 2" and "type 3", "yes" is given in step 556 to maintain the selected assignment rule in step 557 to execute step 558. When the selected channel definition is anything other than "surround", "no" is given in step 555 to execute step 558. In step 558, the selected channel definition is set for respective input channels included in the selected block, with the settings of the channel definition being stored in the flash memory 102.

More specifically, in a case where the selected channel definition is "normal", "normal" is set for each of the eight input channels included in the selected block (see FIG. 5). In a case where the selected channel definition is "stereo", "stereo" is set for each of the eight input channels included in the selected block. In the case of "stereo", the eight input channels are divided into pairs of stereo L and R in order of channel number (see FIG. 5). In a case where the selected channel definition is "surround", "surround" is set for the first six channels of the selected block. More specifically, L, R, C, Ls, Rs, and LFE of "surround" are assigned to the six input channels, respectively. In the case of "surround", furthermore, one of the assignment rules "type 1", "type 2" and "type 3" is selected (see FIG. 6). For the remaining two input channels of the block, nothing is set.

In steps 561 to 568, a channel definition is given to the respective channels of the channels 1 to 8, channels 9 to 18, etc. in accordance with user's selections. When any of the input channels is selected, "yes" is given in step 561 to maintain the selected channel in step 562. For the selection of input channel, the user may select one input channel. Alternatively, the user may select a plurality of input channels together. Steps 563 to 567 are the same as the above-described steps 553 to 557. By the steps 563 to 567, the selected channel definition and assignment rule are maintained. In step 568, the selected channel definition is set for the selected input channel/channels, with the setting/settings of the channel definition being stored in the flash memory 102.

More specifically, in a case where the selected channel definition is "normal", "normal" is set for each of the selected input channels. In a case where the selected channel definition is "stereo", "stereo" is set for each of the selected input channels. In this case as well, the selected input channels are divided into pairs of stereo L and R in order of channel number. In a case where the number of selected input channels is odd, the following input channel is also defined as "stereo". In a case where the selected channel definition is "surround", "surround" is set for each of the selected input channels. Basically, in this case, six input channels are selected to assign L, R, C, Ls, Rs, and LFE of "surround" to the six input channels, respectively. In this case as well, furthermore, one of the assignment rules "type 1", "type 2" and "type 3" is selected for the surround channels. In a case where the number of the selected input channels is less than six, a necessary number of input channels situated on the side where the channel numbers ascend are defined as "surround". Alternatively, in a case where the selected channel definition is "stereo" or "surround" without a sufficient number of input channels for "stereo" or "surround" being selected, the digital mixer may display a message indicative of the insufficient number of input channels on the display unit 104 to prompt the user to additionally select input channels.

Figure 8:
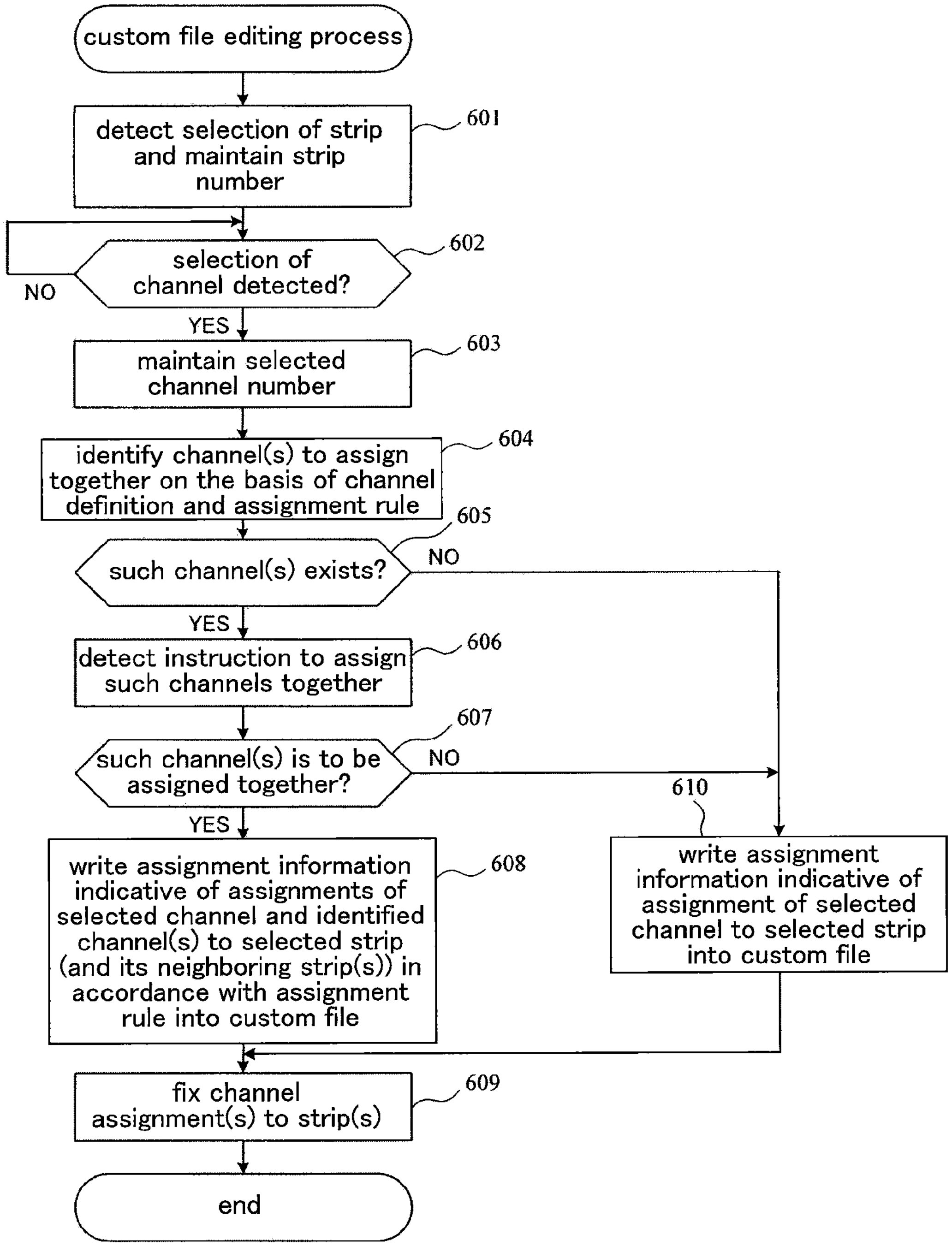
FIG. 8 is a flowchart of a custom file editing process according to the embodiment.

FIG. 8 is a flowchart of a custom file editing process. When the user selects a custom file which the user desires to edit, and performs certain manipulations to enter the edit mode, the process indicated in FIG. 8 starts. In steps 601 to 603, the selected channel strip number and the selected channel number are maintained in accordance with user's selections. In step 604, in accordance with the channel definition and the assignment rule of the selected channel, a channel/channels which is/are to be assigned together with the selected channel is/are identified. In step 605, it is determined whether there is/are such a channel/channels to assign. If the channel definition of the selected channel is "normal", there is no other channel to assign together. Therefore, the process proceeds to step 610. If the channel definition of the selected channel is "stereo" or "surround", there is/are other channel/channels to assign together (in a case of "stereo", there is a channel to pair with the selected channel, whereas in a case of "surround", there are five more channels which form 5.1 ch surround along with the selected channel). Therefore, the process proceeds to step 606.

In step 606, it is detected whether there is a user's instruction to assign the other channel/channels together with the selected channel to the selected channel strip. When there is such an instruction, the process proceeds from step 607 to step 608. If not, the process proceeds from step 607 to step 610. This detection is done in order to confirm user's intention of automatically assigning the channel/channels in addition to the user's selected channel. In step 608, assignment information indicative of assignments of the selected channel and the channel/channels identified in step 604 to the selected channel strip and the neighboring channel strip/strips in accordance with the assignment rule is created. In step 608, furthermore, the created assignment information is written into the targeted custom file. The assignments of these channels to the channel strip/strips are made as explained with reference to FIG. 5 and FIG. 6. In step 609, the assignments of the channel/channels to the channel strip/strips are fixed to terminate the process. When it is determined in step 605 that there is no other channel to assign or when it is determined in step 607 that there is no instruction to assign the other channel/channels together with the selected channel, the process proceeds to step 610 to create assignment information indicative of an assignment of the selected channel to the selected channel strip to write the created assignment information into the targeted custom file. The process then proceeds to step 609.

The process of FIG. 8 is a process for merely creating assignment information indicative of assignment/assignments of the channel/channels to the channel strip/strips and writing the created assignment information into the custom file stored in the flash memory 102. That is, the writing of the assignment information into the custom file will not cause actual changes in the assignments of channels to channel strips. In order to make the assignment information of the custom file affect the actual assignments of channels to channel strips, it is necessary to execute a later-described process of FIG. 10 which starts in response to user's depression of either custom key 1 or custom key 2 so that the assignment information stored in the custom file can be read into the assignment information storage areas of the current memory.

Figure 9:
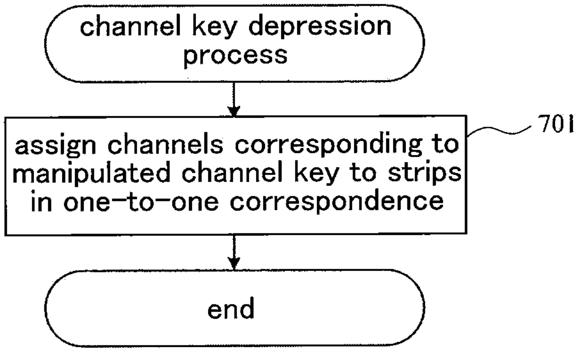
FIG. 9 is a flowchart of a channel key depression process according to the embodiment.

FIG. 9 is a flowchart of a channel key depression process executed when one of the channel keys 341 to 346 is turned on. In step 701, assignment information indicative of respective assignments of sixteen channels corresponding to the manipulated channel key to the channel strips 303-1 to 303-8, 304-1 to 304-8 in a one-to-one correspondence is provided for the assignment information storage areas of the current memory to implement the assignments. The process then terminates.

Figure 10:
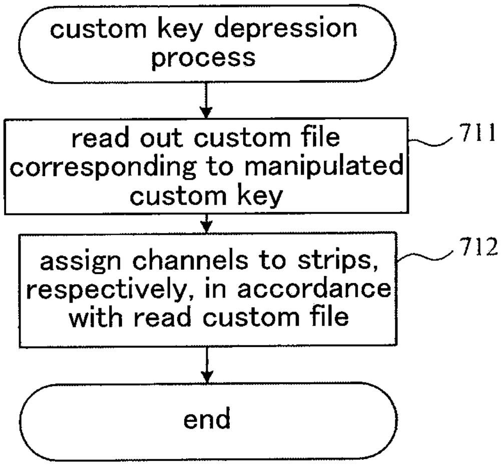
FIG. 10 is a flowchart of a custom key depression process according to the embodiment.

FIG. 10 is a flowchart of a custom key depression process executed when either of the custom keys 1, 2 described with reference to FIG. 4 is turned on. In step 711, the custom file corresponding to the manipulated custom key is read out. In step 712, assignment information stored in the read custom file is provided for the assignment information storage areas of the current memory, so that the channels are assigned to the channel strips 303-1 to 303-8, 304-1 to 304-8, respectively, in accordance with the read assignment information.

Next, a function of selecting a channel from among channels assigned to a channel strip so that the operating elements of the channel strip can affect the selected channel will be explained. As indicated in FIG. 3, each channel strip has various kinds of operating elements. In a case where one channel is assigned to a channel strip, although the user can switch functions served by an operating element by a certain selection manipulation, the encoder 312 basically functions as an operating element for controlling the send level from the corresponding input channel to the MIX bus 205-1 to 205-16, the ON switch 313 functions as an operating element for switching the input channel between ON and OFF, the SEL switch 314 functions as an operating element for selecting the input channel as a channel targeted for control on the channel strip, the CUE switch 316 is an operating element for CUE-monitoring signals input from the input channel, and the fader 318 functions as an operating element for controlling input level of the input channel. In a case where a channel strip is assigned a plurality of channels, it is preferable that the fader 318, for example, functions as an operating element for increasing/decreasing respective levels of the assigned channels together, with the current balance between the channels being maintained, that is, as an operating element which is shared by the assigned channels in order to control the respective channels. Although the encoder 312, the ON switch 313 and the CUE switch 316 are also able to be shared by the channels in order to control the respective channels, these operating elements are useful when each of the operating elements functions as an individual operating element which controls one channel individually.

In this embodiment, therefore, the respective operating elements provided for each channel strip can be separated into shared operating elements and individual operating elements. The shared operating element is used in order to change respective values of a parameter which can be controlled all at once for the respective channels assigned to the channel strip. When the shared operating element of the channel strip is manipulated, the respective channels' values of a parameter corresponding to the manipulated operating element change concurrently in accordance with the manipulation, the respective channels being assigned to the channel strip. The shared operating elements include the fader 318, for example. The individual operating element is used in order to change a value of a parameter which should be controlled individually for each of the channels assigned to the channel strip. More specifically, the individual operating element is used in order to change a value of a parameter which is to be controlled individually for each of the channels assigned to the channel strip, that is, a value of a parameter which can be controlled only on a channel-by-channel basis (or it is preferable that the parameter is controlled on a channel-by-channel basis). The individual operating elements include the encoder 312, the ON switch 313, and the CUE switch 316, for example. Of course, some operating elements can be both the shared operating element and the individual operating element. For example, the CUE switch 316 can be both shared and individual. That is, the CUE switch 316 can be a shared operating element which serves as a switch for instructing to monitor all the channels assigned to the channel strip, whereas the CUE switch 316 can also be an individual operating element which serves as a switch for instructing to monitor one of the assigned channels. Such a dual-use operating element may be determined whether the dual-use operating element is used as a shared or individual operating element, depending on the usability of the two cases. In this embodiment, the fader 318 serves as a shared operating element, while the encoder 312, the ON switch 313 and the CUE switch 316 serve as individual operating elements, respectively.

The SEL switch 314 is used as means for selecting a channel from among channels assigned to a channel strip, the channel being to be controlled when any of the individual operating elements of the channel strip is manipulated. That is, when an individual operating element of the channel strip is manipulated, a corresponding parameter value of the channel selected by use of the SEL switch 314 will be affected by the manipulation of the individual operating element. For convenience of explanation, a concept of a front channel and back channels will be employed. The front channel is a targeted channel which is included in the channels assigned to the channel strip and will be affected by manipulations of the individual operating elements of the channel strip. The back channels are those which will not be affected by manipulations of the individual operating elements. It can be said that the front channel is a channel which is included in the channels assigned to the channel strip and whose parameters which cannot be controlled together with the other assigned channels but can be controlled only individually are allowed to be controlled. It can be said that the back channels are those channels whose parameter values will not be affected by the individual operating elements.

In a case where a plurality of channels are assigned to a channel strip, each time the SEL switch 314 of the channel strip is depressed, one of the assigned channels is selected in turn to be a front channel. The initial value of the front channel may be a channel of the lowest channel number of the assigned channels (in the above-described step 712 of FIG. 10, in a case where a plurality of channels are assigned to a channel strip, a channel having the lowest channel number of the assigned channels may be defined as a front channel).

In the case of FIG. 5, for instance, the channels 9, 10 of stereo L and R are assigned to the channel strip 303-7. Therefore, the initial value of the front channel of the channel strip 303-7 is the channel 9. If the SEL switch 314 of the channel strip is turned on, the front channel switches from the channel 9 to the channel 10. From then on, each time the SEL switch 314 of the channel strip 303-7 is turned on, the front channel switches between the channel 9 and the channel 10. The encoder 312, the ON switch 313 and the CUE switch 316 of the channel strip 303-7 serve as switches for controlling the front channel, respectively. However, the fader 318, which is a shared operating element, serves as an operating element for controlling levels of both the channel 9 and the channel 10 together, regardless of the front channel. The case of "surround" indicated in FIG. 6 is also similar. In the case of the assignment rule "type 1" of FIG. 6, for instance, the channels 1 to 6 are assigned to a channel strip. Therefore, the initial value of the front channel is the channel 1. From then on, each time the SEL switch is turned on, the front channel switches in turn as follows: channel 2→channel 3→channel 4→channel 5→channel 6→channel 1.

In a case where one channel is assigned to a channel strip, regardless of whether a manipulated operating element is shared or individual, the parameter of only the assigned channel (i.e., the parameter of the targeted channel) is affected by the manipulation of the operating element of the channel strip.

Figure 11:
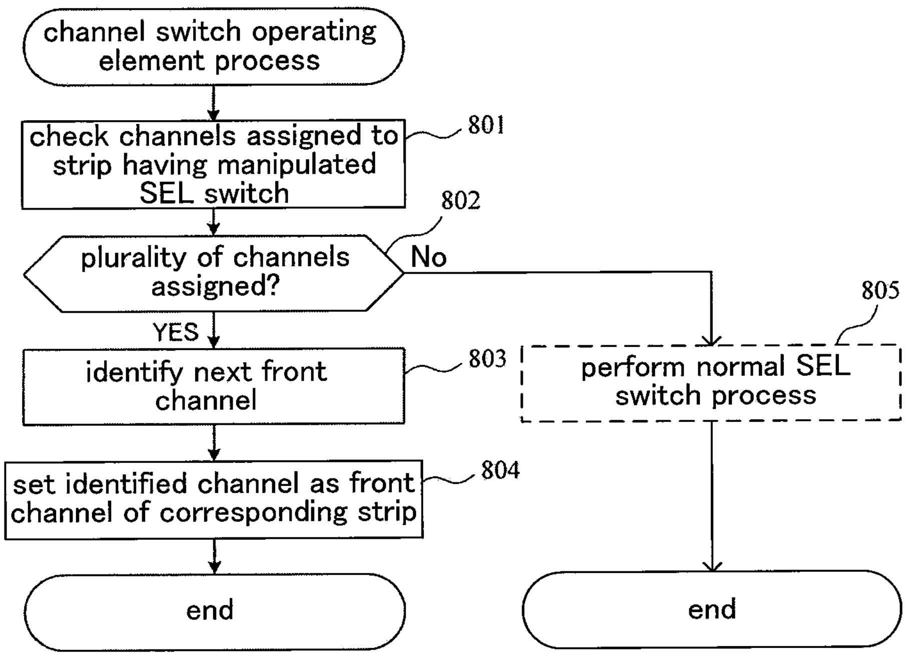
FIG. 11 is a flowchart of a channel switch operating element process according to the embodiment.

FIG. 11 is a flowchart of a channel switch operating element process executed when the SEL switch 314 which is the means for selecting an individually controlled channel is turned on. In steps 801, 802, channels assigned to the channel strip having the manipulated SEL switch 314 are checked to determine whether a plurality of channels are assigned to the channel strip. If not, the process proceeds to step 805 to carry out a normal SEL switch process to terminate the channel switch operating element process. When it is determined in step 802 that a plurality of channels are assigned, the process proceeds to step 803 to identify a channel which is to be the front channel next. In step 804, the identified channel is set as the front channel of the channel strip (more specifically, the channel is provided for the front channel storage area of the current memory) to terminate the channel switch operating element process. When the user switches the front channel, parameters of the channel selected as a new front channel are displayed on the various display portions of the channel strip and a display area which is provided on the display and corresponds to the channel strip.

The check in steps 801, 802 of FIG. 11 where it is determined whether a single channel or a plurality of channels is/are assigned to the channel strip may be done by referring to the assignment information storage area of the current memory. Alternatively, the check may be done as follows. In a case where the channel assignments have been made by use of one of the channel keys 341 to 346 of FIG. 4, it can be determined that there is no possibility that a plurality of channels are assigned to the channel strip. In a case where the channel assignments have been made by use of either of the custom keys 1, 2 of FIG. 4, there is a possibility that a plurality of channels are assigned to the channel strip. By referring to the custom file, therefore, the number of channels assigned to the channel strip is found out. Steps 901, 902 of FIG. 12, and steps 1001, 1002 of FIG. 13 which will be described later are performed similarly.

Figure 12:
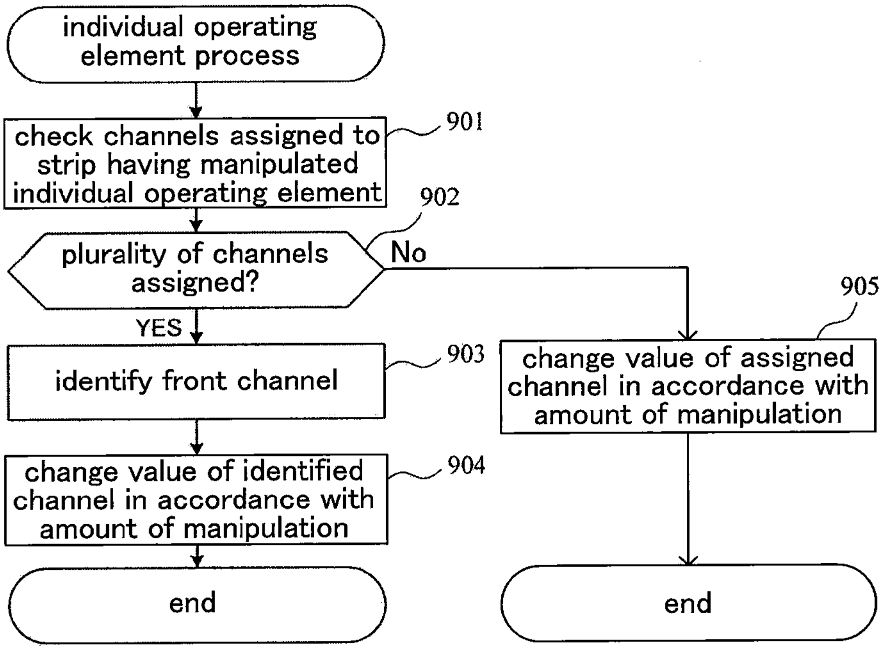
FIG. 12 is a flowchart of an individual operating element process according to the embodiment.

FIG. 12 is a flowchart of an individual operating element process. When an individual operating element of a channel strip is manipulated, this process is carried out. In steps 901, 902, by referring to the assignment information storage area of the current memory, channels assigned to the channel strip are checked to determine whether a plurality of channels are assigned to the channel strip. If not, the process proceeds to step 905 to change the assigned channel's value of a parameter corresponding to the manipulated individual operating element in accordance with the amount of manipulation of the individual operating element. The process then terminates. When it is determined in step 902 that a plurality of channels are assigned to the channel strip, the process proceeds to step 903 to refer to the front channel storage area of the current memory to identify the current front channel of the channel strip. In step 904, the front channel's value of the parameter corresponding to the manipulated individual operating element is changed in accordance with the amount of manipulation of the individual operating element. Then, the process terminates.

Figure 13:
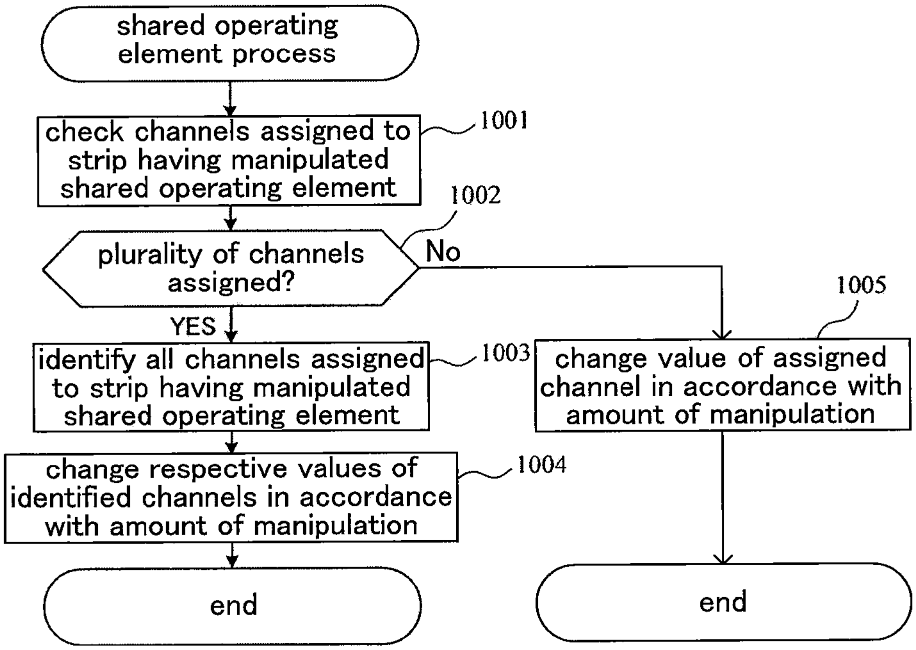
FIG. 13 is a flowchart of a shared operating element process according to the embodiment.

FIG. 13 is a flowchart of a shared operating element process. When a shared operating element of a channel strip is manipulated, the process is carried out. In steps 1001, 1002, by referring to the assignment information storage area of the current memory, channels assigned to the channel strip are checked to determine whether a plurality of channels are assigned to the channel strip. If not, the process proceeds to step 1005 to change the assigned channel's value of a parameter corresponding to the manipulated shared operating element in accordance with the amount of manipulation of the shared operating element. The process then terminates. When it is determined in step 1002 that a plurality of channels are assigned to the channel strip, the process proceeds to step 1003 to refer to the assignment information storage area of the current memory to identify all the channels assigned to the channel strip. In step 1004, the identified channels' values of the parameter corresponding to the shared operating element are changed together in accordance with the amount of manipulation of the shared operating element. Then, the process terminates.

The above-described scheme in which the process of FIG. 11 is performed in order to switch the front channel, the process of FIG. 12 is performed when one of the individual operating elements is manipulated, and the process of FIG. 13 is performed when one of the shared operating elements is manipulated can be employed not only in the above-described case in which a plurality of channels are assigned to the channel strips, respectively, in accordance with the custom file but also in other cases. In a case of a known DCA function by which a plurality of channels are assigned to a DCA strip, for example, the concept of front channel can be adopted to employ the processes of FIGS. 11 to 13.

The above-described embodiment is an example in which the fader 318 serves as a shared operating element whereas the encoder 312, the ON switch 313 and the CUE switch 316 serve as individual operating elements. In a case of a digital mixer which allows the user to specify the correspondence between a physical operating element and a parameter controlled by use of the operating element, (i.e., in a case of a digital mixer in which the user is allowed to select a parameter to be controlled by use of an operating element), it may be defined whether the operating element serves as a shared operating element or an individual operating element according to the parameter to which the operating element currently corresponds. Parameters which can be controlled by use of the shared operating elements for a plurality of channels together include EQ, compressor, tone volume level, on/off of channel, and pan. These parameters are those aiming mainly to control sound characteristics of audio signals output from the input channels. Parameters which are recommended to be controlled separately by use of an individual operating element include head amp gain, attenuator, delay and phase switch. These parameters are those aiming mainly to control sound characteristics of audio signals input to the input channels.

Although the above-described embodiment is designed such that an input channel/input channels is/are assigned to the respective channel strips, the present invention is not limited to the assignments of input channels. That is, mixing channels, output channels or the like may be assigned to the channel strips. In a case where the embodiment is modified such that output channels are assigned to the channel strips, the modified embodiment can be configured as in the case of input channels, by grouping the output channels on the basis of bus types (mix bus, stereo bus and surround bus) which the output channels handle.

Although the embodiment employs the example of 5.1 ch surround, the present invention is also applicable to surround of different numbers of channels (e.g., 6.1 ch surround and 7.1 ch surround).

In the embodiment, the groups are defined by use of channel definitions of normal, stereo and surround. However, groups may be defined without using these channel definitions. More specifically, the embodiment may be modified such that a plurality of channels freely selected from among all the channels are assigned to a channel strip so that the assigned channels can form a group.

In the embodiment, furthermore, a block of channels or channels selected from among a plurality of channels are given a channel definition of normal, stereo or surround. However, the embodiment may be modified such that plural sets of channel definition (block definition) each having a certain number of channels are previously provided so that the user can select one of the channel definition sets to provide the channels included in the block with the channel definition.

Figure 14:
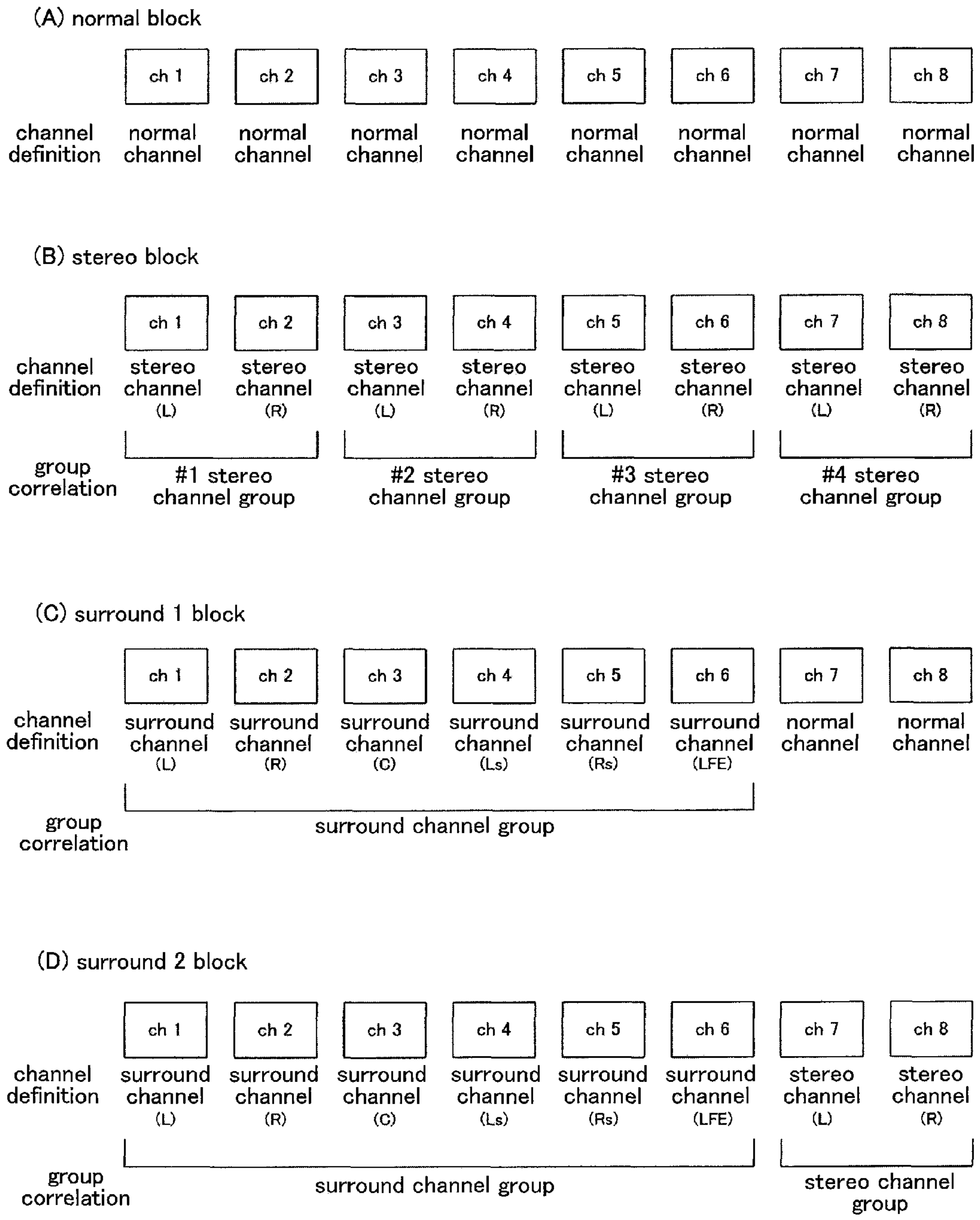
FIG. 14 is example combinations of channel definition according to a modification.

The above-described modification will be explained. FIG. 14 indicates examples in which a block is given a block definition so that each channel belonging to the block can have a channel definition. FIG. 14(A) is a case where a block formed of the channels 1 to 8 is designated as "normal block". In this case, each of the channels 1 to 8 is given a channel definition of "normal channel".

FIG. 14(B) is a case where the block of the channels 1 to 8 is designated as "stereo block". In this case, each of the channels 1 to 8 is given a channel definition of "stereo channel". More specifically, these channels are divided into pairs in an ascending order of channel number so that the two channels of each pair can be correlated with each other as a stereo channel group. As a result, each pair forms a stereo channel group. Each pair is defined such that a channel of an odd channel number is the "L" of stereo, with a channel of the subsequent even channel number being the "R" of stereo. In the shown example of the block of the channels 1 to 8, the channel 1 and the channel 2 form a pair of stereo L, R, and the channel 3 and the channel 4 form a pair of stereo L, R, with the remaining channels similarly forming the pairs.

FIG. 14(C) is a case where the block of the channels 1 to 8 is designated as "surround 1 block". In this case, the first six channels in ascending order of channel number are designated as "surround channels", while the remaining two channels are designated as "normal channels". The first six surround channels are assigned "L", "R", "C", "Ls", "Rs", and "LFE", respectively, in this order. The six channels of the channels 1 to 6 are correlated with each other as a surround channel group so that the six channels can form a surround channel group.

FIG. 14(D) is a case where the block of the channels 1 to 8 is designated as "surround 2 block". In this case, the first six channels in ascending order of channel number are designated as "surround channels", while the remaining two channels are designated as "stereo channels". Similarly to the case of "surround 1 block", the first six surround channels are assigned "L", "R", "C", "Ls", "Rs", and "LFE", respectively. The six channels of the channels 1 to 6 are correlated with each other as a surround channel group so that the six channels can form a surround channel group. The two channels of the channel 7 and the channel 8 are correlated with each other as a stereo channel group so that the two channels can form a stereo channel group.

Although FIG. 14 employs the examples of the block of the channels 1 to 8, each of the channels belonging to the other blocks can be similarly given a channel definition by providing a block definition for each of the other blocks. The respective channel definitions given to the respective channels are stored in the flash memory 102.

Figure 15:
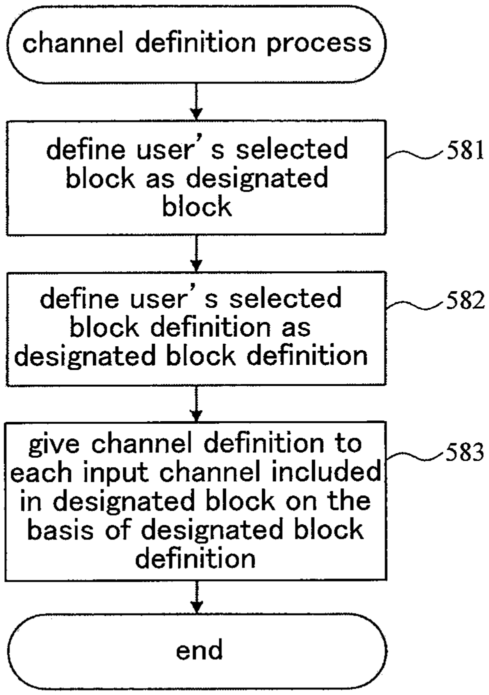
FIG. 15 is a flowchart of a channel definition process according to the modification.

FIG. 15 is a flowchart of a channel definition process executed by the CPU 101 in order to set a channel definition for each channel. This process starts when the channel definition setting screen for setting channel definitions is displayed by a user's certain manipulation. The settings of channel definitions are included in initial settings of the digital mixer. Therefore, the user is required to set a channel definition for every input channel. On the channel definition setting screen, the user selects one of the twelve blocks by use of a switch displayed on the screen. In addition, the user selects one of the four block definitions described with reference to FIG. 14.

In FIG. 15, the block selected by the user is defined as a designated block in step 581. In step 582, the user's selected block definition is defined as a designated block definition. In step 583, on the basis of the designated block definition, each of the eight channels included in the designated block is given a channel definition. The details on the assignments of channel definition to the channels on the basis of the designated block definition have been described with reference to FIG. 14. The respective channel definitions given to the respective channels are stored in the flash memory 102. The user performs the process of FIG. 15 for every block so that every channel can be given a channel definition. As a result, every channel is to have a channel definition.

In this modification as well as the above-described embodiment, furthermore, in a case where "surround" is selected as a channel definition, it is preferable to select an assignment rule from among the assignment rules, types 1 to 3 for the surround channels.

What is claimed is:

1. A digital mixer comprising:

a plurality of processing channels each processing an audio signal in accordance with a parameter;

a plurality of channel strips each having an operating element for setting or changing the parameter of the processing channel included in the plurality of processing channels and assigned to the channel strip;

a channel definition setting portion for setting a channel definition defining whether a processing channel included in the plurality of processing channels is to be used individually or to be used as a group along with another processing channel;

a channel strip selecting portion for selecting a channel strip from among the plurality of channel strips;

a processing channel selecting portion for selecting a processing channel from among the plurality of processing channels;

a determination portion for determining, in accordance with the channel definition provided for the selected processing channel, whether the selected processing channel is a processing channel which is to be used individually or a processing channel which is to be used as a group;

an individual channel assigning portion for assigning, when it is determined by the determination portion that the selected processing channel is a processing channel which is to be used individually, the selected processing channel to the selected channel strip, and allowing control of the parameter of the selected processing channel with the operating element of the channel strip to which the selected processing channel is assigned; and a grouped channel assigning portion for assigning, when it is determined by the determination portion that the selected processing channel is a processing channel which is to be used as the group, the processing channels belonging to the group to the selected channel strip or channel strips including the selected channel strip, and allowing control of the respective parameters of the assigned processing channels belonging to the group with the operating element of the channel strip to which the processing channels are assigned or with the respective operating elements of the channel strips to which the processing channels are assigned.

2. A digital mixer according to claim 1, wherein the channel definition defining the processing channels as being to be used as the group prescribes that the two processing channels are stereo channels having right and left channels used as the group, and the grouped channel assigning portion assigns the two processing channels which are to be used as the group to the selected channel strip, and allows control of the respective parameters of the two processing channels belonging to the group with the operating element of the channel strip to which the two processing channels are assigned.

3. A digital mixer according to claim 1, further comprising:

an assignment rule setting portion for setting an assignment rule applied to the assignment of the processing channels belonging to the group to the selected channel strip or the channel strips including the selected channel strip, wherein the grouped channel assigning portion assigns the processing channels belonging to the group to the selected channel strip or the channel strips including the selected channel strip in accordance with the set assignment rule.

4. A digital mixer according to claim 3, wherein the assignment rule includes a rule by which the processing channels belonging to the group are assigned to the selected channel strip, and a rule by which the processing channels belonging to the group are assigned to the channel strips including the selected channel strip.

5. A digital mixer according to claim 3, wherein the channel definition defining the processing channels as being to be used as the group prescribes that the six processing channels are used as the group for processing signals of front left, front right, center, left surround, right surround and deep bass sound, respectively; and the assignment rule includes:

a first type by which the six processing channels are assigned to the selected channel strip; and a second type by which the processing channel for processing the signal of deep bass sound is assigned to one of the channel strips including the selected channel strip, with the other processing channels being assigned to the other channel strip.

6. A digital mixer according to claim 5, wherein the assignment rule further includes a third type by which the two processing channels for processing the respective signals of front left and front right are assigned to one of the channel strips including the selected channel strip while another two processing channels for processing the respective signals of left surround and right surround are assigned to another channel strip of the channel strips, with the other two processing channels being assigned to the other two channel strips, respectively.

7. A digital mixer comprising:

a plurality of processing channels each processing an audio signal in accordance with a plurality of parameters;

a plurality of channel strips each having a plurality of operating elements for setting or changing the parameters of the processing channel included in the plurality of processing channels and assigned to the channel strip; the operating elements including a shared operating element used in order to set or change the parameter which is able to affect two or more of the processing channels, and an individual operating element used in order to set or change the parameter which is controlled individually for each of the processing channels;

an assigning portion for assigning one or more of the plurality of processing channels to each of the channel strips;

an individually controlled channel setting portion for selecting, in a case where two or more of the processing channels are assigned to a channel strip, one of the two or more processing channels as a processing channel which is to be affected by a manipulation of the individual operating element of the channel strip;

a first parameter controlling portion for controlling, in a case where the operating element of the channel strip to which one of the processing channels is assigned by the assigning portion is manipulated, the parameter of only the assigned processing channel in accordance with the manipulation of the operating element regardless of whether the manipulated operating element is the shared operating element or the individual operating element; and a second parameter controlling portion for controlling, in a case where the shared operating element of the channel strip to which two or more of the processing channels are assigned by the assigning portion is manipulated, the respective parameters of the assigned processing channels together in accordance with the manipulation of the shared operating element, and controlling, in a case where the individual operating element of the channel strip is manipulated, the parameter of only the processing channel selected from among the assigned processing channels by the individually controlled channel setting portion in accordance with the manipulation of the individual operating element.

* * * * *